June 17, 1969      J. M. SNYDER      3,449,834

MAGNET HOLDER FOR CENTERING PIN

Filed July 5, 1968

INVENTOR.
JOHN M. SNYDER

BY Edward Halle
ATTORNEY.

United States Patent Office 3,449,834
Patented June 17, 1969

3,449,834
MAGNET HOLDER FOR CENTERING PIN
John M. Snyder, New York, N.Y., assignor to Commercial Carpet Corporation, New York, N.Y., a corporation of New York
Filed July 5, 1968, Ser. No. 742,794
Int. Cl. B431 9/04
U.S. Cl. 33—27                            4 Claims

ABSTRACT OF THE DISCLOSURE

This invention relates to adjustable magnetic means for holding centering pin means in position in a selected one of a plurality of centering pin receiving means in a tool or the like to provide for adjustment of the tool to various radius sizes.

---

This invention relates to adjustment means for tools or the like which are used to either describe circular patterns or cut circular patterns, for example, a circle cutting tool such as that disclosed in my copending application, Ser. No. 518,648 for Cutting Tool.

In such a tool, there is a cutting blade for cutting circular openings. The tool is adjustable for cutting openings of various diameters by providing a number of centering pin receiving means spaced in graduated increments from the cutting blade. A removable centering pin can be placed in any one of the centering pin receiving means to provide different sized radii for the circles to be cut. Such a tool, in simplified form, is illustrated in the drawings herein. By removing the centering pin such as pin 34 from a centering pin receiving means 32 and placing it in another pin receiving means 32, the size of the circle to be cut is varied. In a tool of this type, it is sometimes difficult to maintain the centering pin 34 in position during the operation of the tool. This follows because the pin points downwardly and the force of gravity may sometimes cause it to fall out thus hampering the utility of the tool.

It is, therefore, an object of this invention to provide means to maintain the centering pin in position and yet permit the pin to be removed and replaced in selected centering pin receiving means with ease. This object is accomplished by providing magnetic means which are adapted to be positioned along the radius of the tool alongside the desired centering pin receiving means so that the pin will remain in position within such means.

The invention is illustrated in the accompanying drawings in which.

Similar numerals refer to similar parts throughout the several views.

Figure 1:
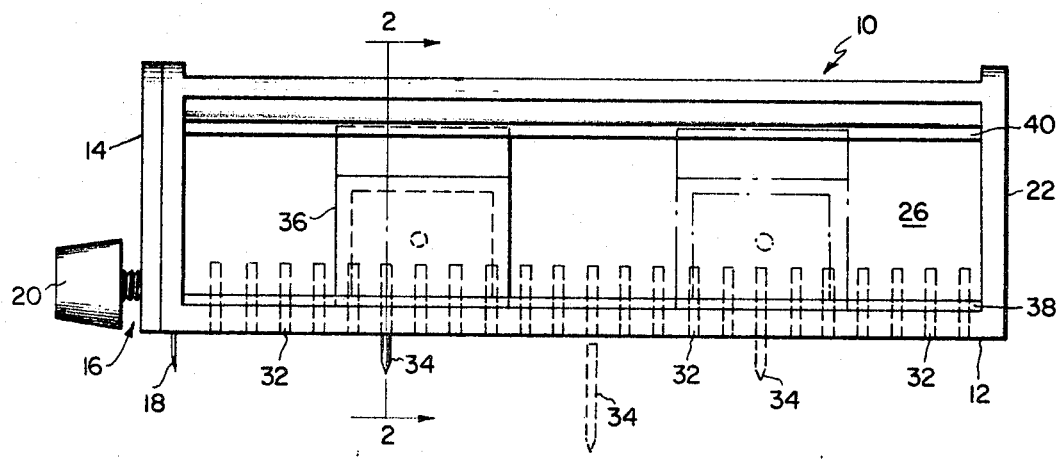
FIG. 1 is a side elevational view with parts in phantom, and in which the movable magnet assembly 36 is shown in one position in solid lines and in another position in dotted lines.

The cutting tool has a body portion 10 including a bottom 12, a front end 14, a cutting assembly 16 including a knife 18, and a control means such as a knob 20 adapted to fix the knife 18 in position. It is to be understood that the knife 18 may be in any type of assembly which will hold the knife in substantial accuracy with relation to the centering means of the device so that an accurate circular cut can be made. Thus, the knife 18 and its assembly and adjustment with relation to the device can be by any means known to the art.

The body portion 10 of the tool also has a back end 22 as well as a hand grip, T-shaped in cross section, comprising the top of the T 24 and the upright of the T 26.

The bottom portion 12 of the device has a lower surface 30. There are a series of centering means such as holes 32 adapted to receive centering pin means such as a pin 34. The centering means 32 are aligned at standard increments along a pathway leading away from the knife 18. Thus, if each centering means 32 is spaced ½ inch apart, and if the first one is spaced ½ inch from the knife 18, then the tool would be adapted to cut holes ranging from 1 inch in diameter to much larger sizes, each size increasing by 1 inch in diameter. This is accomplished by placing the pin 34 in a desired opening 32. The sizes are given by way of illustration only as the tool can be set up to cut diameters of any size.

Figure 2:
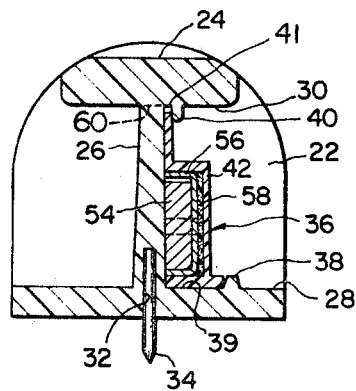
FIG. 2 is a sectional view along the lines 2—2 in FIG. 1.
Figure 3:
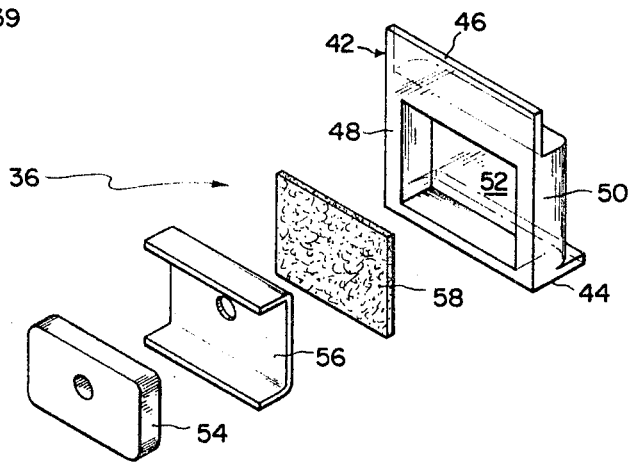
FIG. 3 is an exploded perspective of the magnet assembly.

The magnet holding means for the centering pin comprises a magnet assembly 36 which is slideably mounted with relation to the pathway of the centering means 32 between upright 26 and lower rail 38 which provides a lower track 39; and upper rail 40 which provides an upper track 41. Magnet assembly 36 has a housing 42 which includes a housing bottom 44 and a housing top 46 together with end walls 48 and 50. A side plate 52 together with end walls 48 and 50 provide a recess or pocket for the magnet 54, its magnet holder 56, and a cushion material 58. These components are fitted together in the housing 42 as illustrated in FIGS. 2 and 3 of the drawings.

Housing 42 is slideably mounted within tracks 39 and 41 and is adapted to slide back and forth alongside the pathway formed by the receiving means 32. Reference to the drawings will show that the magnet assembly 36 can be positioned alongside any one of the centering means 32. The magnet assembly 36 may be positioned in the device by either providing for the back 22 or the front 14 to be removable to permit the assembly to be slid between the rails 38 and 40 and upright 26, or the T-shaped top 24 of upright 26 may be provided as a removable component which can be removed for assembly of the device or replacement of the magnet assembly 36. A dotted line shown at reference numeral 60 in FIG. 2 indicates where element 24 may be removed. Element 24 may be mounted by screws or other types of fastening, and front 14 or back 22 may also be mounted by screws or other types of fastening for removal or assembly.

The actual construction of the tool as shown herein is for illustrative purposes only, it being understood that the invention resides in the provision of the slideable magnet assembly adapted to be positioned in the vicinity of a selected centering pin receiving means for the purpose of maintaining the pin 34 within such selected receiving means against the force of gravity.

The cushioning means 58 is provided to force the magnet 54 against upright 26 to provide sufficient friction to hold the magnet in place, thereby holding the magnet assembly in place at a selected position. This friction is not so great as to prevent the magnet assembly 36 from being easily moved by hand to another position. A material such as felt or sponge rubber can be used for the cushion 58. The device itself may be made of any material. However, I prefer to use a clear, high impact plastic as it is useful to be able to see the positioning of the pin 34 through the body of the tool when adjusting the magnet assembly 36.

While I have described my invention in its preferred form, there are other forms which it may take without departing from the spirit and scope of the invention, and I, therefore, desire to be protected for all forms coming within the claims hereinbelow.

Wherefore I claim:

1. A tool for describing a circle including a main body portion comprising means to describe the circle and a plurality of centering means associated therewith, each of said centering means comprising an opening in said body portion and spaced therealong and adapted to receive centering pin means, a pathway on said body portion positioned so that each of said centering means are adjacent thereto at different points along said pathway, magnetic means slideably mounted along said pathway and adapted to be placed selectively in the proximity of each of said centering means, said centering pin means being slideably received within said centering means and being made of material adapted to be attracted by said magnetic means so that said slideable centering pin means will be maintained in a selected centering means when said magnetic means is placed selectively adjacent said centering means.

2. The tool as described in claim 1, in which said magnetic means is comprised of a magnet assembly slideably positioned within track means forming said pathway alongside the plurality of centering means.

3. The tool as described in claim 2 which further comprises friction means to hold the magnet assembly at a selected position along the said pathway.

4. The tool as described in claim 1, in which the main body portion is made of a transparent material so that said centering pin means may be observed through said main body portion when in a selected position in a centering means.

References Cited

UNITED STATES PATENTS

| | | |
|---|---|---|
| 2,134,069 | 10/1938 | Zimmerman. |
| 2,752,683 | 7/1956 | Crane. |
| 2,986,814 | 6/1961 | Brinkman _____ 30—300 |

FOREIGN PATENTS 17,716    1910    Great Britain.

HARRY N. HAROIAN, *Primary Examiner.*

U.S. Cl. X.R.

30—310